Jan. 28, 1930. W. J. BROMLEY 1,744,722
FISHING TOOL
Filed Dec. 15, 1926
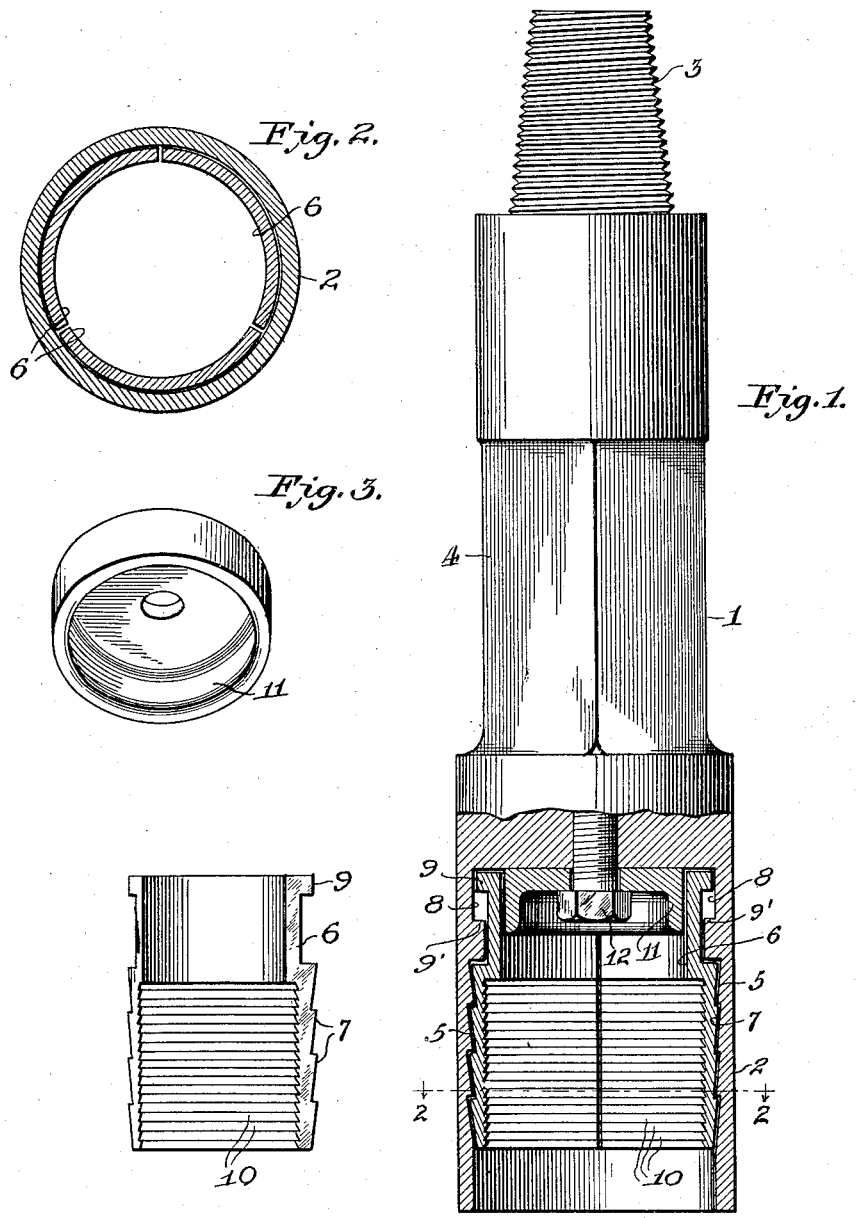
Inventor
William J. Bromley.
By Eccleston + Eccleston
Attorneys Patented Jan. 28, 1930

1,744,722

UNITED STATES PATENT OFFICE

WILLIAM J. BROMLEY, OF WASHINGTON, PENNSYLVANIA, ASSIGNOR TO WASHINGTON MOLD, MACHINE & FOUNDRY CO., OF WASHINGTON, PENNSYLVANIA

FISHING TOOL

Application filed December 15, 1926. Serial No. 154,963.

This invention relates to fishing tools for use in recovering from oil, gas or other wells, drilling tools or bits which have become broken or otherwise separated from the drilling shaft.

There are many kinds of fishing tools, and the present invention relates to that well known type employing a socket in which are mounted a plurality of grippers, and there being a wedging action between the socket and the grippers, whereby the grippers are caused to bite into the article being recovered.

The above-mentioned well known type of fishing tool has several disadvantages, one or two of which will be referred to below.

In the operation of fishing tools of the above-described type, the wedging action causes a severe lateral pressure to be applied to the socket wall; and the greater the downward movement of the grippers the greater becomes this lateral pressure. If this lateral pressure becomes too great the result is that the socket will rupture, with the consequent loss of the tool which is being recovered, as well as the loss of the gripper elements.

Another disadvantage in the above-described type of fishing tool, is that because of wear or because of inherent weaknesses in construction, the grippers slip out of the socket when subjected to a severe strain. When this happens, the tool that is being recovered is lost and the gripper elements are also lost. And it may be mentioned here, that when tools and the like are lost in this manner, the fishing operations become increasingly difficult; for it is apparent that when the articles fall through considerable space they will become twisted and jammed by the impact.

By the present invention I overcome the above-mentioned objectionable features, and others well known to those skilled in the art, by the provision of means which will limit the downward movement of the grippers, and consequently limiting the lateral pressure on the socket; the result being that the socket will not rupture, and the grippers will not be able to slip out of the socket.

The numerous advantages of the invention will be apparent from the following detailed description, when taken in connection with the accompanying drawings; in which, Figure 1 is a side elevation of the improved fishing tool with parts broken away to more clearly show the interior construction.

Figure 2 is a sectional view through the fishing tool taken on line 2—2 of Figure 1.

Figure 3 is a perspective view of the spacing collar, and Figure 4 is a side elevation of one of the slips.

Referring to the drawing more specifically the numeral 1 indicates generally the fishing tool which includes a socket portion 2 at its lower end and a threaded shank 3 at its upper end for engagement with a complementary part attached to the shaft or the like employed in the drilling operations. The shank portion 4 of the tool is preferably of angular cross section for cooperation with a wrench or the like in the operation of attaching and detaching the tool.

The interior of the socket 2 is provided with a plurality of annular ledges each of which is inclined downwardly and inwardly to provide a series of circular wedge-shaped surfaces 5 for cooperation with the grippers or slips 6 which are three in number in the present disclosure, although it will be understood that this number may be increased or decreased as desired. The convex surface of each gripper member 6 is formed with a plurality of arc-shaped wedge portions 7 equal in number to the surfaces 5 on the socket member and adapted for cooperation therewith.

The construction thus far described is in substantial accordance with well known fishing tools in common use prior to the present invention. It will be apparent that in the operation of a fishing tool of the construction thus far described, the wedging action between the socket and the grippers causes a severe lateral pressure on the socket, and the farther the grippers move downward the greater becomes the lateral pressure on the socket; and there being no means to limit the downward movement of the grippers, the pressure often becomes sufficient to rupture the socket, or the grippers may escape from the socket, without rupturing it. In the present invention I have provided means to engage the grippers after they have moved downward a predetermined extent, and thus I definitely limit the amount of lateral pressure that will be applied to the socket; and such means also afford a relief to the grippers if they should be subjected to too great a longitudinal pull, and prevent any possibility of the grippers escaping from the socket. The means for accomplishing these highly desirable results will now be described.

In the upper portion of the socket 2 I have provided an annular channel 8, in which is received the outwardly directed flange 9 on the upper end of the grippers. The lower side of the channel is defined by an abutment or shoulder 9′ which is provided on the inner side of the socket wall and preferably extends completely therearound. It will be observed that the vertical dimension of the groove 8 is such as to permit a limited reciprocating movement of the grippers but to prevent their complete withdrawal from the socket member, by reason of the engagement of the abutment 9′ by the flange 9.

The inner faces of the grippers 6 are provided with the usual upwardly directed teeth 10 for biting into the tool being raised; and obviously these grippers will be forced inwardly by the wedging action between the socket and the grippers.

The parts are assembled by merely passing the slips or grippers into the socket 2 and seating their flanges 9 in the channel 8. To retain the grippers in place I provide a collar 11, which may be removably attached to the top wall of the socket by any suitable means, such as a machine screw 12, after the grippers have been arranged in place.

In operation, the fishing tool is lowered into the well, in the usual manner, until it surrounds the upper end of the tool, at which time an upward pull is applied to the operating shaft; and by the well known wedging action the grippers are caused to be moved inward, thereby forcing the teeth 10 to bite into the tool.

As the grippers move downwardly the flanges 9 come into contact with the abutment 9′, and further downward movement of the grippers is prevented. Further, this engagement of the flanges 9 with the abutment 9′ is assured by reason of the collar 11 which prevents inward movement of the grippers to such an extent as to allow a flange 9 to pass by the abutment 9′. It is thus apparent that after the grippers have moved downwardly a limited extent to bring the flange and abutment into engagement no further downward movement is possible, and consequently the lateral pressure that may be applied to the socket is definitely limited.

It is apparent that if no means is provided to limit the downward movement, then there is no means for limiting the lateral pressure on the socket, and this may increase until the socket is ruptured; or even if not ruptured the grippers may escape from the socket. But in accordance with the present invention, when the grippers have moved downwardly a fixed extent to bring the flange and abutment into engagement, no further downward movement is possible, and consequently the lateral pressure that may be applied to the socket is definitely fixed. And further an excessive longitudinal pull is taken care of by the abutment, which also prevents the escape of the grippers under any condition. And further, all possibility of the flange not engaging the abutment is avoided by the use of the retaining collar 11.

From the foregoing description it will be seen that I have provided a simple and inexpensive fishing tool of the socket type, which possesses numerous highly desirable features, by reason of which the accidental release of a tool is reduced to a minimum if not entirely eliminated.

While I have shown and described what is now my preferred construction, it is apparent that the invention is subject to many changes and modifications, all of which I aim to include in the scope of the following claims.

What I claim is:

1. A fishing tool including a socket, a collar arranged within the socket and spaced from the wall thereof, a plurality of wedge shaped grippers arranged within the socket and each having an upper portion occupying the space between said collar and the socket wall, and cooperating means carried by said upper portion of the grippers and by the socket wall for limiting the extent of downward movement of the grippers.

2. A fishing tool including a socket, a plurality of individual wedge shaped grippers arranged within the socket, a detachable collar arranged within the socket and forming with the wall of the socket an annular space in which the upper ends of the grippers are received, outwardly directed flanges on the upper ends of the grippers, and an annular shoulder on the interior of said socket for cooperation with the flanges on said grippers.

3. A fishing tool including a socket, a plurality of individual, wedge-shaped grippers arranged within the socket, an abutment extending inwardly from the socket wall and spaced from the base of the socket, an outwardly extending flange carried by the upper end of each of said grippers, said abutment and flanges adapted to cooperate to limit the downward movement of the grippers, and means free from and normally out of contact with said grippers to prevent lateral disengagement of said flanges from said abutment.

4. A fishing tool including a socket member and a solid shank portion, a plurality of individual, wedge shaped grippers arranged within the socket, an outwardly extending flange formed on the upper end of each gripper, an annular abutment formed on the interior of said socket for cooperation with said flange, and means detachably connected with said socket member free from and normally out of contact with said grippers to prevent lateral disengagement of the flanges from said abutment.

WM. J. BROMLEY.